Aug. 27, 1940.   H. J. BRODERSON ET AL   2,212,583
REACTION CHAMBER
Filed Oct. 26, 1938
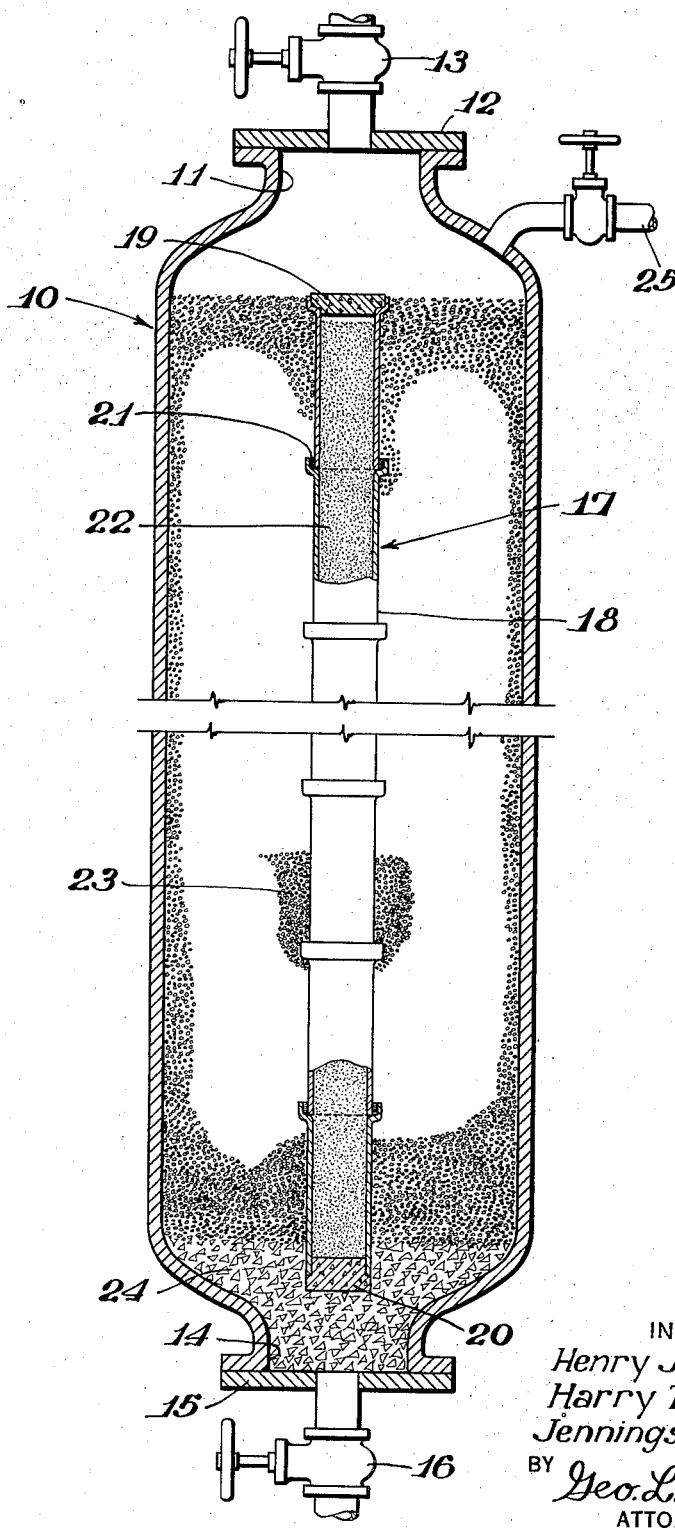
INVENTORS
Henry J. Broderson
Harry T. Rogers
Jennings B. Hamblen
BY Geo. L. Parkhurst
ATTORNEY Patented Aug. 27, 1940

2,212,583

UNITED STATES PATENT OFFICE 2,212,583

REACTION CHAMBER

Henry J. Broderson, La Marque, Harry T. Rogers, Galveston, and Jennings B. Hamblen, Texas City, Tex., assignors to Pan American Refining Corporation, New York, N. Y., a corporation of Delaware Application October 26, 1938, Serial No. 237,064

4 Claims. (Cl. 23—288)

This invention relates to a reaction chamber and more particularly to a reaction chamber intended to be filled with a catalyst or other subdivided solid, and to a method and means for removing such subdivided solid from the reaction chamber.

In commercial chemical processes, particularly those involving the conversion of hydrocarbon materials, the use of solid contact materials is gaining wide application. This is especially true of catalytic processes, such as cracking, polymerization, hydrogenation, dehydrogenation, alkylation, isomerization, etc. In such processes, the catalyst is frequently in the form of solid particles, ranging in size from a few hundredths of a millimeter to several millimeters or more in diameter and of any desired shape. These particles may be composed of the catalytic material, or may be in the form of a support on which the catalytic agent is deposited.

All such catalytic agents sooner or later must be removed from the reaction zone, because of deterioration and inactivation. It has frequently been found that this is extremely laborious and time-consuming, due to the fact that the catalyst in the lower part of the reaction vessel has become so solid and impervious that "mining" is necessary to loosen it sufficiently to permit its withdrawal.

The cause of this solidification of the lower catalyst mass may be due to any one of, or a combination of, a number of conditions. The catalyst may be of such a physical structure that it breaks down into "fines" which sift to the bottom of the catalyst bed, and are there packed together by the weight of catalyst above. During the conversion of the stock under treatment a certain amount of heavy resin-like material may be formed which finds its way to the bottom of the reactor, there to "cement" the particles together due to heat and pressure. During the regeneration in situ of the catalyst, particularly if air is employed for regeneration, temperatures sufficiently high to fuse the catalyst may occur, and it has been found by experience that these high temperatures generally occur at the base of the catalyst mass.

Whatever the reason may be, it has been found that the lower portion of the catalytic material is often so "cemented" that it must be chipped and broken by physical means before the bulk of the catalyst can be discharged. This may be dangerous as well as laborious, since, as soon as the lower catalyst layer is dislodged, the weight of the entire remaining catalyst bed will force it out of the reaction chamber, with possible injury to the workmen, and damage to the reaction chamber.

It is an object of our invention to provide a reaction chamber from which the greater portion of a discretely subdivided contact material can be discharged easily and readily. It is a further object of our invention to provide means whereby said solids can be discharged from a reaction chamber. Other and more detailed objects of our invention will become apparent as the description thereof proceeds.

A preferred embodiment of my invention includes a reaction chamber having substantially axially disposed therein a sectional pipe, the sections of which can be removed to permit the discharge of solid materials. This will be described with particular reference to the accompanying drawing, which is a vertical section, of a reaction chamber in accordance with our invention. This drawing forms a part of this specification and is to be read in conjunction with it.

A reaction chamber 10, of suitable shape and material, has an upper opening through which solid material can be charged, closed by cover 12, through which leads valved conduit 13, for the introduction of feed stock from an outside source. At the lower end of reaction chamber 10 is located opening 14, through which solid material can be discharged, closed by cover 15, through which leads valved conduit 16 for the withdrawal of products from reaction chamber 10.

Located within reaction chamber 10 is catalyst discharge means 17, which is a vertical conduit built up of pipe sections 18. A concrete cap 19 closes the upper portion of conduit 17, and a concrete plug 20 closes the lower end. Pipe sections 18 can be of vitrified tile or other suitable refractory material, and are belled at one end so that the spigot end of one section will fit into the belled opening of the adjacent section. The juncture between the belled end of one pipe section and the spigot end of the adjacent section is caulked by asbestos rope 21 or other suitable material to prevent leakage of the feed stock into conduit 17.

Conduit 17 is filled with sand 22 or other suitable inert material not affected by high temperature, to prevent the crushing of the pipe sections 18 by the solid material 23 with which the reaction chamber 10 is filled. Sand 22 also prevents feed stock, from valved conduit 13, from entering conduit 17 through leaks, if any, at the junctures of the bells and spigots and thus short-circuiting through the chamber, since sand 22 will have a greater resistance to flow than solid material 23.

The lower part of reaction chamber 10 is preferably filled with aggregate 24 of refractory material above the level of the lower end of conduit 17 to facilitate access to concrete plug 20. Air or other regenerative gases may be introduced through valved line 25, or through lines 13 or 16, and withdrawn through any of these lines through which the regenerating medium is not being introduced.

In order to discharge contact material 23 from reaction chamber 10, cap 15 with valved conduit 16 is removed from opening 14, and cap 12 with valved conduit 13 removed from opening 11. Aggregate 24 falls through opening 14, exposing concrete plug 20, which can be drilled out or removed by other appropriate means, thereby permitting sand 22 to be discharged, leaving a free passage throughout the length of conduit 17. The uppermost pipe of pipe sections 18 is removed through opening 11, or can be crushed, if necessary, and allowed to fall through conduit 17. The removal of this pipe section will expose an orifice below the upper level of solid material 23, which solid material will flow out through conduit 17. This flow can be aided by the use of air hammers or other vibrating means on the shell of reaction chamber 10.

As soon as the level of the solid material has reached the remaining uppermost part of conduit 17, another pipe section 18 is removed, and this is repeated until all of the contact material has been discharged. If the lower portion of the catalyst mass is so fused and impervious that it will not flow, it can now be "mined" out with ease, and without danger to the workmen, since the weight of material above it has been removed.

To prepare the reaction chamber 10 for reuse, cover 15 is replaced over opening 14, a portion of coarse aggregate 24 is added through opening 11, and the lowermost pipe section 18, with its concrete plug 20 in place, is installed.

Additional pipe sections are superimposed upon the lowermost section, and caulking 21 applied to the junctures until the proper level is attained. Conduit 17 thus formed is filled with sand 22, and concrete cap 19 applied. The additional aggregate 24 can now be added, and the remaining space about conduit 17 filled with the desired discretely subdivided contact material, which can be any of various types of clay, catalyst pellets, granular material, etc.

While we have described our invention in connection with a specific embodiment thereof it is to be understood that this is by way of illustration and not by way of limitation and we do not mean to be restricted thereto but only to the subject matter of the appended claims.

We claim:

1. A reaction chamber for the conversion of hydrocarbons comprising a shell, means in said shell defining openings for introducing and removing a subdivided solid contact material, means for introducing material to be contacted, means for removing reaction products, a substantially vertical conduit built up of removable superimposed bell and spigot sections of refractory material substantially axially disposed within said shell and extending throughout at least the greater part of the length thereof, for the progressive discharge of said contact material by the successive removal of said sections, removable means for closing the upper and lower ends of said conduit, and a bed of heat-resistant free-flowing material disposed between the lower end of said conduit and said opening for removing said contact material.

2. A reaction chamber for the conversion of hydrocarbons comprising a shell, means in said shell defining openings for introducing and removing a subdivided solid contact material, means for introducing a fluid material to be contacted with said contact material, means for removing reaction products, a substantially vertical conduit built up of superimposed removable sections so constructed and arranged that on the successive removal of said sections said contact material is progressively discharged through said conduit, a subdivided solid contact material disposed between said conduit and said shell, and removable means for preventing the flow through said conduit of said material to be contacted.

3. In a reaction chamber for the conversion of hydrocarbons comprising a shell, means in said shell defining openings for introducing and removing a subdivided solid contact material and means for introducing into and removing from said shell a fluid material to be contacted with said contact material, the improvement which comprises a substantially vertical conduit built up of superimposed removable sections so constructed and arranged that on the successive removal of said sections said contact material is progressively discharged throughout said conduit, a subdivided solid contact material disposed between said conduit and said shell, a subdivided thermally inert material disposed within said conduit, and plugging means to hold said thermally inert material in place in said conduit and to prevent the flow through said conduit of said material to be contacted.

4. In a reaction chamber for the conversion of hydrocarbons comprising a shell, means in said shell defining openings for introducing and removing a subdivided solid contact material, and means for introducing into and removing from said shell a solid material to be contacted with said contact material, the improvement which comprises a substantially vertical conduit built up of superimposed removable sections so constructed and arranged that on the successive removal of said sections said contact material is progressively discharged through said conduit, a relatively coarsely subdivided refractory material disposed within said shell below said conduit and above said opening for removing said solid contact material, a subdivided solid contact material disposed between said conduit and said shell above said refractory material, a subdivided thermally inert material disposed within said conduit and plugging means to hold said thermally inert material in place in said conduit and to prevent the flow through said conduit of said material to be contacted.

HENRY J. BRODERSON.
HARRY T. ROGERS.
JENNINGS B. HAMBLEN.

CERTIFICATE OF CORRECTION.

Patent No. 2,212,583.　　　　　　　　　　　　August 27, 1940.

HENRY J. BRODERSON, ET AL.

It is hereby certified that error appears in the printed specification of the above numbered patent requiring correction as follows: Page 2, second column, line 36, claim 3, for the word "throughout" read --through--; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.